(12) United States Patent
Lupash et al.

(10) Patent No.: US 6,281,836 B1
(45) Date of Patent: Aug. 28, 2001

(54) HORIZONTAL/VERTICAL PROTECTION LEVEL ADJUSTMENT SCHEME FOR RAIM WITH BARO MEASUREMENTS

(75) Inventors: Lawrence O. Lupash, Sunnyvale; Joseph M. Wlad, Alameda, both of CA (US)

(73) Assignee: Trimble Navigation LTD, Sunnyvale, CA (US)

( * ) Notice: Subject to any disclaimer, the term of this patent is extended or adjusted under 35 U.S.C. 154(b) by 0 days.

(21) Appl. No.: 09/337,371

(22) Filed: May 21, 1999

(51) Int. Cl.[7] .................................................. H04B 7/185
(52) U.S. Cl. ......................................................... 342/357.02
(58) Field of Search ........................ 342/357.02, 357.14, 342/358, 29, 32; 701/213, 214, 13

(56) References Cited

U.S. PATENT DOCUMENTS 5,636,123 * 6/1997 Rich et al. .............................. 342/29

OTHER PUBLICATIONS

Lee, Receiver autonomous integrity monitoring (RAIM) capability for sole–means GPS navigation in the oceanic phase of flight, Mar. 1992, IEEE, pp. 464–472.*
Trimble Navigation Limited, Force GPS specifications, 1996, 3 pages.*

* cited by examiner

Primary Examiner—Daniel T. Pihulic
(74) Attorney, Agent, or Firm—Boris G. Tankhilevich

(57) ABSTRACT

The method of supplementing the satellite data by the satellite-calibrated baro data when the receiver autonomous integrity monitoring function (RAIM) is unavailable and when the horizontal protection level (HPL) does not satisfy the horizontal alert limit (HAL) requirement is disclosed. The baro data is adjusted to compensate for the lack of baro calibration in the position solution domain. The HPL is re-computed using the satellite-calibrated adjusted baro data. The re-computed HPL could satisfy the HAL requirement which would make the RAIM function available when it would be otherwise unavailable.

8 Claims, 3 Drawing Sheets

HIGH LEVEL LOGIC FOR HPL / VPL ADJUSTMENT

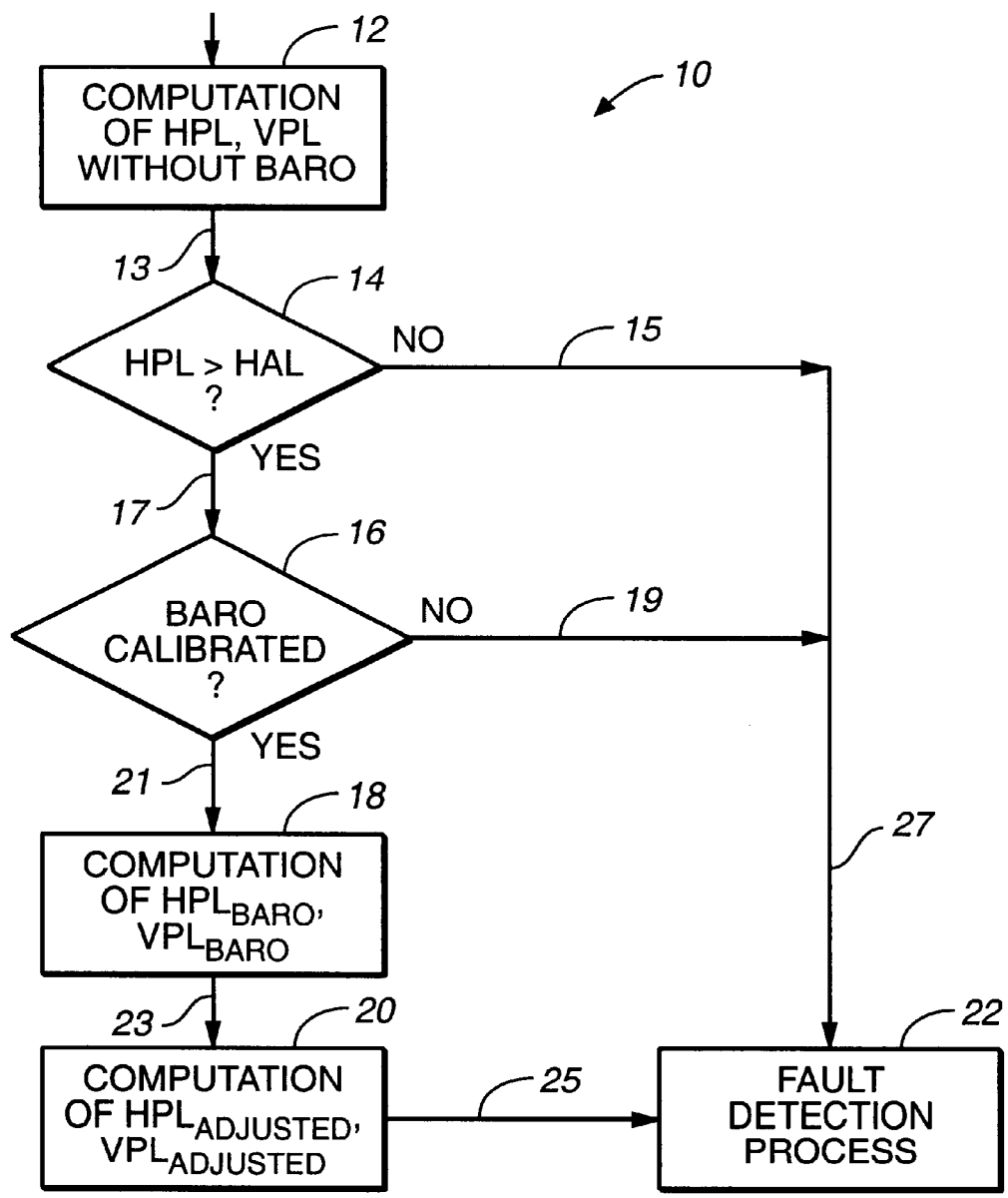
FIG._1
HIGH LEVEL LOGIC FOR HPL / VPL ADJUSTMENT

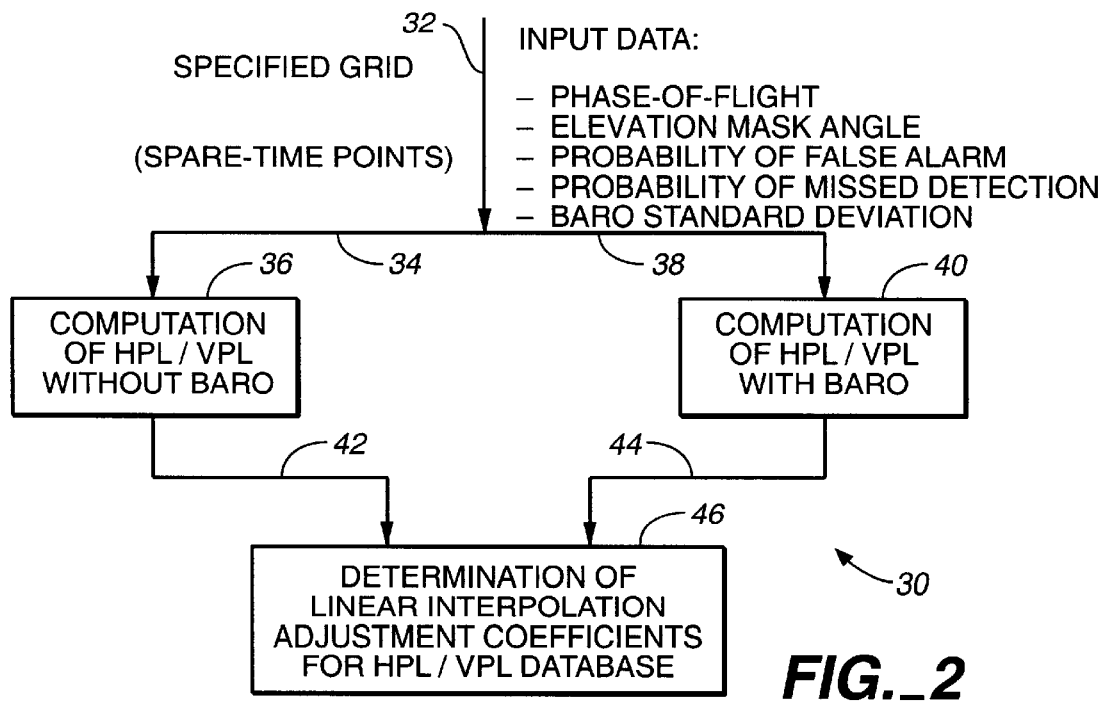
FIG._2
OFF-LINE COMPUTATION OF HPL / VPL ADJUSTMENT COEFFICIENTS
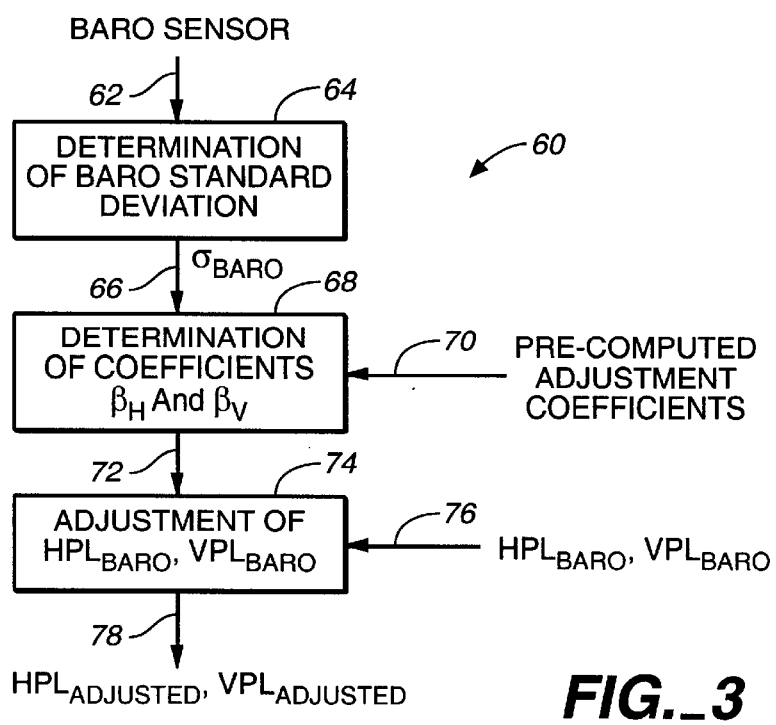
FIG._3
REAL-TIME COMPUTATION OF ADJUSTED HPL / VPL

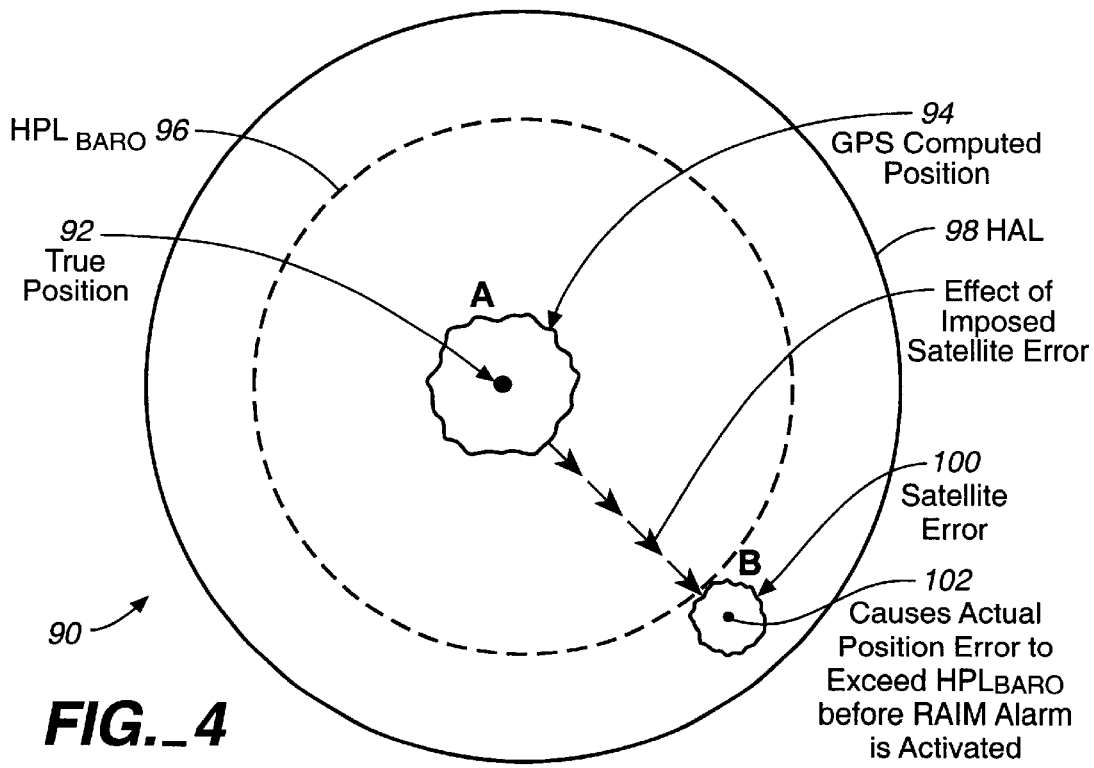
FIG._4
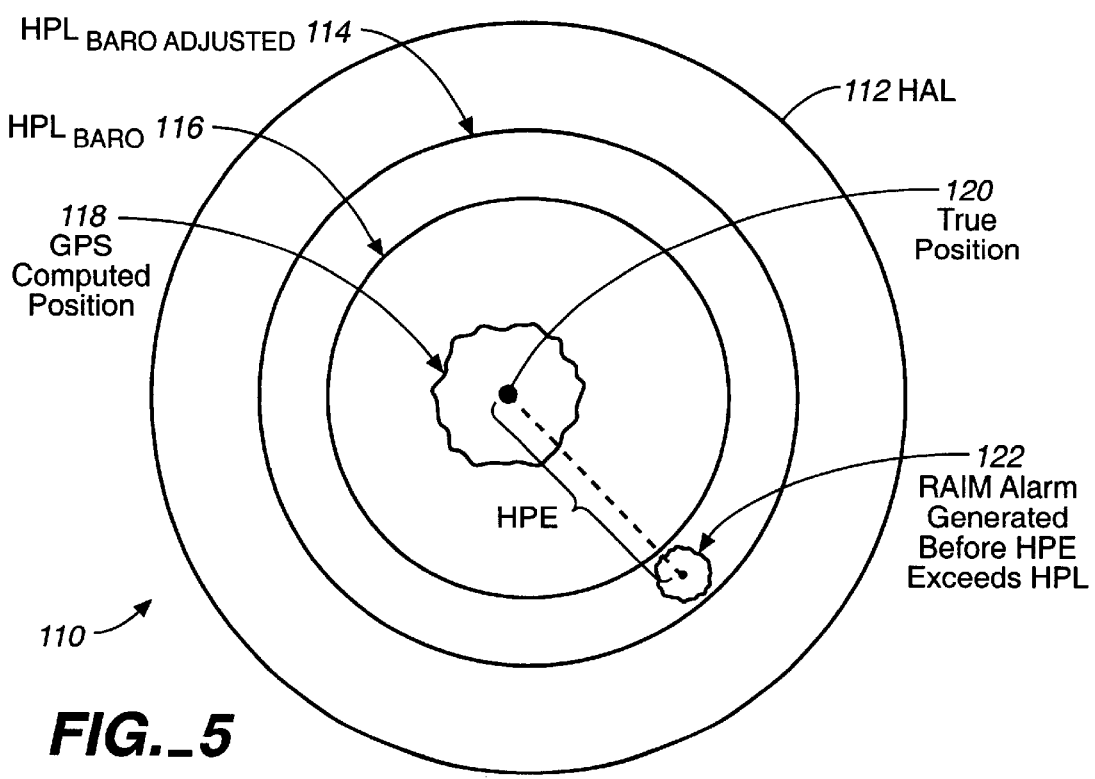
FIG._5

HORIZONTAL/VERTICAL PROTECTION LEVEL ADJUSTMENT SCHEME FOR RAIM WITH BARO MEASUREMENTS

BACKGROUND

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 21 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency f1=1575.42 MHz (nineteen centimeter carrier wavelength) and an L2 signal having a frequency f2=1227.6 MHz (twenty-four centimeter carrier wavelength). These two frequencies are integral multiplies f1=1,540 f0 and f2=1,200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

Use of PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers operated by users.

A first known PRN code for each GPS satellite, sometimes referred to as a precision code or P-code, is a relatively long, fine-grained code having an associated clock or chip rate of f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats.

Accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k (=1,2, . . . 24) is the channel or satellite number. These frequencies lie in two bands at 1.597–1.617 GHz (L1) and 1,240–1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($r_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite.

After the SATPS receiver determines the coordinates of the i-th SATPS satellite by demodulating the transmitted ephemeris parameters, the SATPS receiver can obtain the solution of the set of the simultaneous equations for its unknown coordinates ($x_0$, $y_0$, $z_0$) and for unknown time bias error (cb). The SATPS receiver can also determine velocity of a moving platform.

The given above discussion assumes that a satellite navigational system used for the navigation purposes is functioning properly.

GPS satellites can provide users with warnings of satellite malfunctions. Sometimes, the warnings may take more than 5 minutes before the user is aware of a malfunction.

Aviation applications require a more timely notification of a satellite failure condition. Thus, a means to independently monitor satellite integrity is required.

One of these means is receiver autonomous integrity monitoring (RAIM). The RAIM method is based on a self-consistency check among the available measurements. The RAIM consistency check uses redundant measurements as a means to determine GPS integrity.

The discussion given below can be found in "Global Positioning System: Theory and Applications", Volume II, chapter 5, by Bradford W. Parkinson and James J. Spilker Jr., published by the American Institute of Aeronautics and Astronautics, Inc. in 1996.

There are two main approaches to RAIM (not considering several hybrid approaches).

In the first main method, the snapshot scheme, only current redundant measurements are used for the self-consistency check. In the second main method, the averaging or filtering scheme, both past and present measurements are used in the RAIM decision.

The theoretical foundation for RAIM is statistical detection theory. Two hypothetical-testing questions are posed: (1) Does a failure exist? and (2) If so, which is the failed satellite? The basic assumption is that there is only one failed satellite at a time. Determination of which satellite has failed is more difficult than a simple failure detection, and it requires more measurement redundancy.

The Radio Technical Commission for Aeronautics (RTCA) published its Minimum Operational Performance Standards (MOPS) for GPS as a supplemental navigation system in July 1991 (Document RTCA /DO-208). The main requirements are shown in Table 1 (see below). The maximum allowable alarm rate in Table 1 refers to the usual false alarm rate with no satellite malfunction. The specification requires that both the detection and alarm-rate specification should be met globally at all times, otherwise the satellite geometry should be declared as inadmissible for integrity purposes.

In a basic snapshot RAIM scheme the noisy redundant range-type measurements are available at a given sample point in time. It is convenient to use the six-satellites-in-view-case as an example, that is the number of satellites in view N=6. The generalization to N=5 or N>6 is fairly obvious.

In a range comparison method for six satellites there are six linearized over-determined equations in four unknowns. If there is no noise, one can solve the first four equations to obtain a solution that satisfies the first four equations. The resulting solution can be used to predict the remaining two measurements, and the predicted values can be compared with the actual measured values. If the two differences (residuals) are small, the detection algorithm detects "no failure". On the other hand, if either or both of the residuals are large, it declares "failure". The notion of "small" and "large" are defined by deciding whether the typical sample point lies inside or outside the decision boundary in the two-dimensional test statistic plane. This is the essence of the range comparison method.

TABLE 1

| Phase of Flight | Horizontal Alert Limit (HAL) | Maximum allowable false rate | Time to alarm | Minimum Detection Probability |
|---|---|---|---|---|
| En route (oceanic, domestic, random, & J/V routes) | 2.0 n. mi. | 0.002/h | 30 s | 0.999 |
| Terminal | 1.0 n. mi. | 0.002/h | 10 s | 0.999 |
| RNAV approach, non-precision | 0.3 n. mi. | 0.002/h | 10 s | 0.999 |

In the least-squares-residuals RAIM method for the same six-in-view satellites example, one obtains the least squares "solution" for six equations in four unknowns. The least-squares solution can be used to predict the six measurements. Six residuals are then grouped together as a six-to-one vector in the measurement domain. The linear transformation takes the range measurement into the resulting residual vector. The sum of the squares of the residuals plays the role of the basic nonnegative scalar observable in the least-squares-residuals RAIM method. The positive semi-infinite real line can be partitioned into two parts, one for "no failure", and the other for "failure". The dividing point is called the threshold. In this method one can use a constant alarm-rate strategy by precalculating the thresholds (partitions) that yield the desired alarm rate for the various anticipated values of N. (In general, N is equal to the number of measurements). Then the real-time algorithm sets the threshold appropriately. For the zero-mean Gaussian assumption the sum of the squares of the residuals has an unnormalized chi-square distribution with (N−4) degrees of freedom. One can use chi-square statistics to find the threshold based on false alarm rate and missed detection rate for the N-number of measurements used. The sum of the squares of the residuals, which is a scalar, is used as the test statistic which is compared to the threshold. Thus, the least-squares-residuals RAIM method is easy to implement because its test statistic is a scalar, regardless of the number N of measurements used.

The RAIM parity method is more formal and less heuristic than either the range comparison method or the least-squares-residuals method. In this method, for the same six-in-view satellites example, the measurement vector is linearly transformed. The upper partitioned part of the transformation yields the usual least-squares solution. The lower partitioned is called the parity vector. For simple detection, one can obtain all the information about the parity vector by looking at its magnitude, or its magnitude squared. Thus, in the parity method, the test statistic for detection reduces to a simple scalar, as was the case with the least-squares-residuals method. The least-squares-residuals method and the parity method lead to identical observables, and with similar threshold settings, yield identical results. It can be shown, that the range-comparison space can be mapped to parity space. Thus, all three methods yield the same results.

Another RAIM implementation is the maximum separation of solution RAIM method. If there are N satellites in view, one can consider the N subset solutions obtained by omitting one satellite at a time from the full set. If a failure exists, the failed satellite is omitted from one of the subsets, and the solution thus obtained is declared a "good" solution. All other subsets contain the failed satellite, and they are in error to various degrees. If the pseudorange error in the failed satellite gradually increases with time, one would expect the subset solutions to begin to spread apart with time, and the maximum separation observed among the N solutions can be used as a measure of the solutions spread. The "good" solution remains near truth, because it does not contain the failed satellite. If there is no failure present, the solutions should remain grouped around the true position. Thus, the maximum observed solution separation in the horizontal plane can be used as a scalar and nonnegative test statistic. The "no-failure" decision is separated from the "failure" decision with some detection probability by the threshold that can be set by utilizing the relationship between the radial error and the radial-error-protection level. The detection probability varies with satellite geometry. However, this method is not practical because it requires N solutions.

In the constant-detection-rate/variable-protection-level method, a snapshot RAIM scheme differs significantly from the four methods described above. In this method, the parity vector is used as the basic test statistic, and a threshold is set to yield the desired constant alarm rate. To keep the detection probability constant, as the satellite geometry varies, the smallest radial error, or the protection radius, is used as a failure criterion. The protection radius can be calculated, in real time, on an essentially continuous basis. The variable-detection-level method could be used within the context of the RTCA specifications where fixed, discrete alarm limits are set for each phase of flight, as shown in Table. 1. When the protection radius exceeds the specified alarm limit, the alarm should be triggered, which would indicate the inadequate satellite geometry. On the other hand, if the test statistic exceeds the threshold, the alarm also would be triggered. If this is the case, the alarm would be indicative of a satellite malfunction. In either of those situations, the RTCA MOPS precludes satellite-only navigation. Thus, an airplane should be equipped with an alternative source of navigation when the satellite-based navigation fails. This is called a GPS supplementary navigation.

The supplementary navigation of an airplane can be performed by using both satellite-derived data and non-satellite-derived data, like barometric altimeter data (baro-data), for example. However, baro data that can assist in detection of the satellite failure should be satellite-calibrated first.

In the copending patent application Ser. No. 09/300,934 now U.S. Pat. No. 6,205,377, filed on Apr. 27, 1999, and incorporated in its entirety in the present patent application, a method of a satellite supplementary navigation of a moving platform by using both satellite-derived data and satellite-calibrated baro data is disclosed. The patent application Ser. No. 09/300,934 now U.S. Pat. No. 6,205,377 is herein referred to as the patent application #1.

The patent application #1 included the assumption that the baro data is used to calibrate the satellite-derived position fixes. In reality, the baro data is very noisy and is not recommended to be used directly in the satellite-derived position fixes.

Thus, what is needed is a technique that would allow one to adjust the baro-calibrated parameters in order to compensate for the lack of baro-measurement in the satellite-derived position fixes domain. The adjusted baro data parameters can be used to supplement the satellite navigation of a moving platform.

SUMMARY

The present invention is novel and unique because it discloses a method for supplementary navigation of a moving platform using satellite data supplemented by satellite-calibrated barometric altimeter (baro) data, wherein the baro-calibrated parameters are adjusted in order to compensate for the lack of baro-measurement in the satellite-derived position fixes domain.

In one embodiment, the moving platform includes a satellite receiver and a barosensor.

In one embodiment, the method of the present invention comprises the following steps: (1) acquiring a plurality of satellite signals; (2) checking whether a satellite configuration is substantially sufficient; (3) if the satellite configuration is substantially sufficient, and if the satellite data obtained from the substantially sufficient satellite configuration utilizing the satellite receiver is substantially sufficient, utilizing the satellite data for obtaining position fixes of the moving platform; and (4) if the satellite configuration is not substantially sufficient, or if the satellite data obtained from the substantially sufficient satellite configuration is not substantially sufficient, supplementing the satellite data by the satellite-calibrated baro data obtained utilizing the barosensor.

In one embodiment, the satellite configuration includes a GPS satellite configuration, a satellite receiver includes a GPS satellite receiver, and satellite calibrated baro data includes GPS-calibrated baro data.

In one embodiment, the step (2) of checking whether the satellite configuration is substantially sufficient further includes the steps of: (2,1) continuously determining a number N of visible satellites being tracked by the satellite receiver, wherein N is an integer; and (2,2) declaring the satellite configuration as substantially sufficient if the number N of satellites being tracked is greater than a predetermined number K, wherein K is an integer.

The step of checking whether the satellite configuration is substantially sufficient further includes the steps of: continuously determining a number N of visible GPS satellites being tracked by a GPS receiver; and declaring the satellite configuration as substantially sufficient if the number N of GPS satellites being tracked is greater than a predetermined number.

In one embodiment, the predetermined number K is equal to 4 for a three-dimensional determination of position fixes of the moving platform.

In another embodiment, the predetermined number K is equal to 3 for a two-dimensional determination of position fixes of the moving platform.

In one embodiment, the step (3) of checking whether the satellite data obtained from the substantially sufficient satellite configuration is substantially sufficient further includes the steps of: (3,1) continuously computing a horizontal protection level (HPL) and a vertical protection level (VPL); (3,2) checking whether the horizontal protection level (HPL) is less than a horizontal alert limit (HAL); (3,3) if the horizontal protection level (HPL) is less than the horizontal alert limit (HAL), declaring a receiver autonomous integrity monitoring (RAIM) function available and declaring the satellite data obtained by using the satellite receiver as substantially sufficient for obtaining position fixes of the moving platform; and (3,4) if the horizontal protection level (HPL) is greater than the horizontal alert limit (HAL), declaring the receiver autonomous integrity monitoring (RAIM) function unavailable and declaring the satellite data obtained by using the satellite receiver as not substantially sufficient for supplemental navigation of the moving platform.

In one embodiment, the step of supplementing the satellite data by the satellite-calibrated baro data further includes the steps of: (a) checking whether the baro data is satellite-calibrated; (b) if the baro data is satellite-calibrated, adding the satellite-calibrated baro data to the satellite data to recompute the horizontal protection level (HPL) in order to obtain a baro-calibrated horizontal protection level ($HPL_{baro}$); (c) if the baro data is satellite-calibrated, adding the satellite-calibrated baro data to the satellite data to recompute a vertical protection level (VPL) in order to obtain a baro-calibrated vertical protection level ($VPL_{baro}$); (d) adjusting the ($HPL_{baro}$) in order to compensate for the lack of baro data measurement in the satellite position solution domain, wherein the adjusted horizontal protection level ($HPL_{adj}$) is used instead of ($HPL_{baro}$) in the determination of the availability of the receiver autonomous integrity monitoring (RAIM) function; (e) adjusting the ($VPL_{baro}$) in order to compensate for the lack of baro data calibration in the satellite position solution domain, wherein the adjusted vertical protection level ($VPL_{adj}$) is used instead of ($VPL_{baro}$) in the determination of the availability of the receiver autonomous integrity monitoring (RAIM) function; (f) checking whether the adjusted horizontal protection level ($HPL_{adj}$) is less than or equal to the horizontal alert limit (HAL); (g) checking whether the adjusted vertical protection level ($VPL_{adj}$) is less than or equal to the vertical alert limit (VAL); and (h) if the adjusted horizontal protection level ($HPL_{adj}$) is less than or equal to the horizontal alert limit (HAL), and if the adjusted vertical protection level ($VPL_{adj}$) is less than or equal to the vertical alert limit (VAL), declaring the receiver autonomous integrity monitoring (RAIM) function available.

In one embodiment, the step of adjusting the ($HPL_{baro}$) in order to compensate for the lack of baro data measurement in the satellite position solution domain further includes the steps of: off-line computation of a set of interpolation coefficients used in the computation of an HPL adjustment coefficient $\beta_h$; measuring, in real time, an instant value of standard deviation of baro measurement error $\sigma_{baro}$; determination, in real time, of the HPL adjustment coefficient $\beta_h$ by using linear interpolation scheme as function of the instant value of the standard deviation of baro measurement error $\sigma_{baro}$; and multiplying, in real time, the ($HPL_{baro}$) by the adjustment coefficient $\beta_h$ in order to obtain the adjusted horizontal position level ($HPL_{adj}$).

In one embodiment, the step of adjusting the ($VPL_{baro}$) in order to compensate for the lack of baro data measurement in the satellite position solution domain further includes the steps of: off-line computation of a set of interpolation coefficients used in the computation of a VPL adjustment coefficient $\beta_h$; measuring, in real time, an instant value of standard deviation of baro measurement error $\sigma_{baro}$; determination, in real time, of the VPL adjustment coefficient $\beta_v$ by using linear interpolation scheme as function of the instant value of the standard deviation of baro measurement error $\sigma_{baro}$; and multiplying, in real time, the ($VP_{baro}$) by the adjustment coefficient $\beta_v$ in order to obtain the adjusted horizontal position level ($VPL_{adj}$).

BRIEF DESCRIPTION OF THE DRAWINGS

FIG. 1 depicts a high level logic flow chart for the HPL/VPL adjustment.

FIG. 2 illustrates the flow-chart of the off-line computation of HPL/VPL adjustment coefficients.

FIG. 3 depicts the flow chart of the real-time computation of adjusted HPL/VPL.

FIG. 4 shows how the satellite error causes the actual position error to exceed $HPL_{baro}$ before RAIM alarm is activated.

FIG. 5 illustrates how the RAIM alarm can be generated before the horizontal position error (HPE) exceeds the $HPL_{adj}$, wherein the HPE is equal to the GPS estimated position minus the true position.

FULL DESCRIPTION OF THE PREFERRED EMBODIMENTS

The present patent application addresses the issue of compensating for the lack of baro measuremnet of the satellite-derived position fixes in the method for supplemental navigation of a moving platform using satellite data supplemented by satellite-calibrated baro data.

In one embodiment, a moving platform includes a satellite receiver and a barosensor. The satellite system can include a GPS system, a GLONASS system, a combined GPS/GLONASS system or any other satellite positioning system (SATPS). The satellite receiver can include a GPS receiver, a GLONASS receiver, a combined GPS/GLONASS receiver, or any other satellite receiver configured to receiver the satellite signal emanated by the utilized satellite system.

In the preferred embodiment, the satellite system includes GPS system, a satellite receiver includes a GPS receiver.

After acquiring a plurality of GPS satellite signals, the GPS position fixes are computed using only GPS-derived data.

The next step is a step of checking how many satellites (SV's) are being tracked by the GPS receiver.

In general, if six or more satellites are being tracked, the GPS receiver can isolate a failed satellite. This means, that the GPS receiver can perform the complete receiver autonomous integrity monitoring (RAIM) function without supplementing the GPS data with any other navigation data, including baro data.

If only five satellites are being tracked, the GPS receiver can perform fault detection using receiver autonomous integrity monitoring (RAIM) without supplementing the GPS data with any other navigation data, but in some cases baro data would be needed to perform a complete RAIM function including fault detection and fault isolation/exclusion.

Thus, if the number of GPS satellites being tracked is 5 or more, the GPS receiver can compute the horizontal protection level (HPL) based on satellite geometry given by the measurement observation matrix (H), and based on the noise factor given by the weighting factor matrix (R). The computed HPL can be utilized to determine RAIM fault detection availability.

If, on the other hand, the number of GPS satellites being tracked is less than 5, the GPS receiver cannot execute the RAIM function without using baro data, as was explained in the patent application #1 that is incorporated herein in its entirety.

Indeed, the RAIM function provides a timely warning of a satellite failure. All RAIM schemes employ some form of consistency check among redundant measurements. A commonly used quantitative indicator of such consistency is the sum of the squares of the range residuals, or its equivalent in parity space. This quantitative indicator, or its square root, is used as the test statistic in the particular RAIM scheme that is utilized in the present patent application.

In addition to providing a timely warning of a satellite failure, the RAIM function can be also utilized to provide a performance index. The protection parameter that is applicable to fault detection only (in contrast to fault detection and isolation/exclusion) is referred to as horizontal protection level (HPL). The protection parameters of interest are the horizontal protection level (HPL) and the vertical protection level (VPL). The test statistic is the sum-of-the-squared-range-residuals (or its square root) and its chi-square distribution.

The relationship between the test statistic and the induced horizontal position errors is such that the maximum horizontal slope is obtained by maximizing over all horizontal slopes:

$$\text{HSLOPE}_{max} = \max_{over\ all\ i\text{-}measurements}[\text{HSLOPE}(i)]. \quad (1)$$

The satellite with the largest horizontal slope is the satellite whose failure is most difficult to detect.

If the actual error in position determination is less than HPL, a faulty satellite signal will be detected with probability greater than the imposed probability, e.g. 0.999.

The horizontal alert limit (HAL) requirement in the position determination of an airplane for different phases of flight is given above in Table I.

The GPS receiver computes the horizontal protection level (HPL) in order to compare HPL with the horizontal alert limit (HAL).

The step of computation the horizontal protection level (HPL), and the step of comparing HPL with the horizontal alert limit (HAL), comprise the RAIM detection availability test, as explained in the patent application #1.

If HPL$\leq$HAL, then the RAIM function is available, and one can continue with the computation of the RAIM test statistic in order to detect the potential faulty satellite.

However, if HPL>HAL, then the RAIM function is not available, and one can use the supplemental baro data in order to re-compute the baro-dependent horizontal protection level HPL$_{baro}$. In this way, the HPL$_{baro}$ can be made less than the HAL, thereby activating the RAIM function. The baro data should be satellite-calibrated, thus allowing to supplement the satellite data by the satellite-calibrated baro data in order to re-compute the baro-dependent horizontal protection level HPL$_{baro}$ and the baro-dependent vertical protection level VPL$_{baro}$.

The satellite-calibrated baro data can be used to re-compute the RAIM function. However, the satellite-derived position fixes are not re-computed using the satellite-pre-calibrated baro data because the baro data is inherently noisy and incoherent as compared with the satellite-derived data. The RAIM detection procedure is a snapshot, wherein we need to quickly determine the fault satellite.

Due to variety of reasons it is desirable to avoid using baro measurement in the position fixes computation. So, the baro measurement is used for the RAIM function but not in the position or velocity computations. This design approach can lead to a reduction in missed detection performance (specified as 0.999) under some unique satellite geometry conditions meaning that the HPL$_{baro}$ value may sometimes be too optimistic (or too small).

The above-given reasoning is illustrated in FIG. 4. Indeed, we can increase the pseudorange error on the most difficult to determine satellite in order to test whether the RAIM function can determine the error in the GPS computed position (94 of FIG. 4) as compared to the true position (92 of FIG. 4) before the horizontal position error circle (100 of FIG. 4) reaches the HPL$_{baro}$ (96 of FIG. 4). It is required that the RAIM function should detect this type of error with a probability of 0.999. However, the lack of baro measurement in the satellite derived position fixes can cause the horizontal position error circle (100 of FIG. 4) to exceed the HPL$_{baro}$ (96 of FIG. 4) before the RAIM alarm is activated under some unique satellite geometries.

The proposed method is to eliminate this conflict by adjusting the HPL and VPL quantities computed with baro measurement to a level approximating the HPL and VPL quantities computed without baro measurements. This method that constitutes the essence of the present invention is shown as a flow chart (10 of FIG. 1).

After computation of HPL and VPL without baro (step 12), we test whether HPL exceeds HAL (14). If the answer is no (logical arrow 15), we undertake the standard fault detection process (22). If the answer is yes (logical arrow 17), the next step (16) is to check whether the baro data is satellite-calibrated. If this is the case (logical arrow 21), one can add the satellite-calibrated baro data to the satellite data to recompute the horizontal protection level (HPL) in order to obtain a baro-calibrated horizontal protection level (HPL$_{baro}$) and to recompute the vertical protection level (VPL) in order to obtain a baro-calibrated vertical protection level (VPL$_{baro}$) (step 18).

The next step (20) is the adjustment of the (HPL$_{baro}$) in order to compensate for the lack of baro data measurement in the satellite position solution domain, and the adjustment of the (VPL$_{baro}$) in order to compensate for the lack of baro data calibration in the satellite position solution domain. The adjusted horizontal protection level (HPL$_{adj}$) is used instead of (HPL$_{baro}$) and the adjusted vertical protection level (VPL$_{adj}$) is used instead of (VPL$_{baro}$) in the determination of the availability of the receiver autonomous integrity monitoring (RAIM) function.

If the adjusted horizontal protection level (HPL$_{adj}$) is less than or equal to the horizontal alert limit (HAL), and if the adjusted vertical protection level (VPL$_{adj}$) is less than or equal to the vertical alert limit (VAL), one can declare the receiver autonomous integrity monitoring (RAIM) function available.

FIG. 2 depicts the flow chart (30) of the off-line computation of a set of interpolation coefficients used in the computation of an HPL/VPL adjustment coefficient $\beta_h/\beta_v$. After the specified data (for instance, phase-of-flight, elevation mask angle, probability of false alarm, probability of missed detection, baro standard deviation) is input (step 32), the HPL/VPL is computed without baro (step 36) and with baro (step 40). The adjustment of the HPL and VPL quantities computed with baro measurement to a level approximating the HPL and VPL quantities computed without baro measurement eliminates the conflict between the RAIM fault detection process computed with baro measurement and the position fixes measurement computed without baro data.

In one embodiment, the interpolation coefficients are determined (step 46) for a specific phase-of-flight, elevation mask angle used, probability of false alarm, probability of missed detection, and space-time grid used; the coefficients for a set of specified conditions are pre-computed and stored into specified tables.

FIG. 3 is a flow chart (60) of a real-time computation of adjusted HPL$_{adj}$ and VPL$_{adj}$ parameters. The step of real time computation of the HPL adjustment coefficient $\beta_h$ and the step of real time computation of the VPL adjustment coefficient $\beta_v$ further includes the step of measuring, in real time, an instant value of standard deviation of baro measurement error $\sigma_{baro}$ (step 64).

In one embodiment, the adjustment scheme is a first order linear interpolation between pre-selected points corresponding to specific values of the standard deviation of baro measurement error $\sigma_{baro}$. In this embodiment, the step (68) of determination, in real time, of the HPL adjustment coefficient $\beta_h$ and of the VPL adjustment coefficient $\beta_v$ is done by using linear interpolation scheme as function of the instant value of the standard deviation of baro measurement error $\sigma_{baro}$.

EXAMPLE

The piece-wise linear interpolation of $\beta_h$ and of $\beta_v$ is as follows (when $\sigma_{baro}$ is in meters):
when $\sigma_{baro} < 34$ $\beta_h = 1.655 + 0.0019412*(34 - \sigma_{baro})$;

$\beta_v = 1.945$;  (2)

when $34 \leq \sigma_{baro} < 165$ $\beta_h = 1.273 + 0.002916*(165 - \sigma_{baro})$;

$\beta_v = 1.510 + 0.0033206*(165 - \sigma_{baro})$;  (3)

when $165 \leq \sigma_{baro} < 477$ $\beta_h = 1.099 + 0.000557692*(477 - \sigma_{baro})$;

$\beta_v = 1.129 + 0.001221*(477 - \sigma_{baro})$;  (4)

when $477 \leq \sigma_{baro} < 1000$ $\beta_h = 1.033 + 0.000126195*(1000 - \sigma_{baro})$;

$\beta_v = 1.041 + 0.00016826*(1000 - \sigma_{baro})$;  (5)

when $\sigma_{baro} \geq 1000$ $\beta_h = 1.033$ $\beta_v = 1.041$.  (6)

The real time adjusted horizontal position level ($HPL_{adj}$) can be obtained by multiplying the ($HPL_{baro}$) by the computed, in real time, adjustment coefficient $\beta_h$; wherein the real time adjusted vertical position level ($VPL_{adj}$) can be obtained by multiplying the ($VPL_{baro}$) by the computed, in real time, adjustment coefficient $\beta_v$ (step 74).

Diagram (110) of FIG. 5 is a modification of a diagram (90) of FIG. 4, wherein the $HPL_{baro\ adjusted}$ level (114) is such that the RAIM alarm is generated before the horizontal position error (HPE) exceeds the $HPL_{baro\ adjusted}$ level, wherein the HPL is equal to the GPS estimated position minus the true position. Generally, the $HPL_{baro\ adjusted}$ level is larger than the $HPL_{baro}$ but smaller than HPL.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method for satellite supplementary navigation of a moving platform using a satellite data supplemented by a satellite-calibrated baro data; said moving platform including a satellite receiver and a barosensor; said method comprising the steps of:

(a) acquiring a plurality of satellite signals;
(b) checking whether a satellite configuration is substantially sufficient;
(c) if said satellite configuration is substantially sufficient, and if said satellite data obtained from said substantially sufficient satellite configuration utilizing said satellite receiver is substantially sufficient,
 (c1) continuously computing a horizontal protection level (HPL) and a vertical protection level (VPL);
 (c2) checking whether said horizontal protection level (HPL) is less than or equal to a horizontal alert limit (HAL);
 (c3) if said horizontal protection level (HPL) is less than or equal to said horizontal alert limit (HAL), declaring a receiver autonomous integrity monitoring (RAIM) function available and declaring said satellite data obtained by using said satellite receiver as substantially sufficient for obtaining position fixes of said moving platform;
 (c4) if said horizontal protection level (HPL) is greater than said horizontal alert limit (HAL), declaring said receiver autonomous integrity monitoring (RAIM) function unavailable and declaring said satellite data obtained by using said satellite receiver as not substantially sufficient for obtaining position fixes of said moving platform; and
(d) if said satellite configuration is not substantially sufficient, or if said satellite data obtained from said substantially sufficient satellite configuration is not substantially sufficient, supplementing said satellite data by said satellite-calibrated baro data obtained utilizing said barosensor.

2. The method of claim 1, wherein said step of supplementing said satellite data by said satellite-calibrated baro data further includes the steps of:

checking whether said baro data is satellite-calibrated;

if said baro data is satellite-calibrated, adding said satellite-calibrated baro data to said satellite data to recompute said horizontal protection level (HPL) in order to obtain a baro-calibrated horizontal protection level ($HPL_{baro}$);

if said baro data is satellite-calibrated, adding said satellite-calibrated baro data to said satellite data to recompute a vertical protection level (VPL) in order to obtain a baro-calibrated vertical protection level ($VPL_{baro}$);

adjusting said ($HPL_{baro}$) in order to compensate for the lack of baro data measurement in the satellite position solution domain, wherein said adjusted horizontal protection level ($HPL_{adj}$) is used instead of ($HPL_{baro}$) in the determination of the availability of said receiver autonomous integrity monitoring (RAIM) function;

adjusting said ($VPL_{baro}$) in order to compensate for the lack of baro measurement in the satellite position solution domain, wherein said adjusted vertical protection level ($VPL_{adj}$) is used instead of ($VPL_{baro}$) in the determination of the availability of said receiver autonomous integrity monitoring (RAIM) function;

checking whether said adjusted horizontal protection level ($HPL_{adj}$) is less than or equal to said horizontal alert limit (HAL);

checking whether said adjusted vertical protection level ($VPL_{adj}$) is less than or equal to said vertical alert limit (VAL); and if said adjusted horizontal protection level ($HPL_{adj}$) is less than or equal to said horizontal alert limit (HAL), and if said adjusted vertical protection level ($VPL_{adj}$) is less than or equal to said vertical alert limit (VAL), declaring said receiver autonomous integrity monitoring (RAIM) function available.

3. The method of step 2, wherein said step of adjusting said ($HPL_{baro}$) in order to compensate for the lack of baro data measurement in the satellite position solution domain further includes the step of:

off-line computation of a set of interpolation coefficients used in the computation of an HPL adjustment coefficient $\beta_h$.

4. The method of step 2, wherein said step of adjusting said ($VPL_{baro}$) in order to compensate for the lack of baro data measurement in the satellite position solution domain further includes the step of:

off-line computation of a set of interpolation coefficients used in the computation of a VPL adjustment coefficient $\beta_v$.

5. The method of step 2, wherein said step of adjusting said ($HPL_{baro}$) in order to compensate for the lack of baro data calibration in the satellite position solution domain further includes the steps of:

real time computation of an HPL adjustment coefficient $\beta_h$; and multiplying said ($HPL_{baro}$) by said adjustment coefficient $\beta_h$ in order to obtain said adjusted horizontal position level ($HPL_{adj}$).

6. The method of step 2, wherein said step of adjusting said ($VPL_{baro}$) in order to compensate for the lack of baro data calibration in the satellite position solution domain further includes the steps of:

real time computation of a VPL adjustment coefficient $\beta_v$; and multiplying said ($VPL_{baro}$) by said adjustment coefficient $\beta_v$ in order to obtain said adjusted horizontal position level ($VPL_{adj}$).

7. The method of claim 5, wherein said step of real time computation of said HPL adjustment coefficient $\beta_h$ further includes the steps of:

measuring, in real time, an instant value of standard deviation of baro measurement error $\sigma_{baro}$; and determination, in real time, of said HPL adjustment coefficient $\beta_h$ by using linear interpolation scheme as function of said instant value of said standard deviation of baro measurement error $\sigma_{baro}$.

8. The method of claim 6, wherein said step of real time computation of said VPL adjustment coefficient $\beta_v$ further includes the steps of:

measuring, in real time, an instant value of standard deviation of baro measurement error $\sigma_{baro}$; and determination, in real time, of said VPL adjustment coefficient $\beta_v$ by using linear interpolation scheme as function of said instant value of said standard deviation of baro measurement error $\sigma_{baro}$.

* * * * *